United States Patent [19]
Hulbert

[11] Patent Number: 5,920,555
[45] Date of Patent: Jul. 6, 1999

[54] PILOT ASSISTED DIRECT SEQUENCE SPREAD SPECTRUM SYNCHRONIZATION APPARATUS

[75] Inventor: Anthony Peter Hulbert, Shirley, United Kingdom

[73] Assignee: Roke Manor Research Limited, Hampshire, United Kingdom

[21] Appl. No.: 08/843,991

[22] Filed: Apr. 17, 1997

Related U.S. Application Data

[63] Continuation-in-part of application No. 08/508,629, Jul. 28, 1995, abandoned.

[30] Foreign Application Priority Data

Jul. 28, 1994 [GB] United Kingdom ................... 9415191

[51] Int. Cl.$^6$ ........................... H04B 1/707; H04B 7/216; H04J 13/04
[52] U.S. Cl. ........................ 370/342; 370/350; 370/516; 375/206; 375/209; 375/371
[58] Field of Search ..................... 370/335, 342, 370/349, 350, 441, 503, 516, 517, 518; 375/200, 206, 208, 209, 210, 327, 340, 343, 362, 371, 373, 376

[56] References Cited

U.S. PATENT DOCUMENTS

| | | | |
|---|---|---|---|
| 4,385,401 | 5/1983 | Jagnow et al. | 375/200 |
| 5,077,754 | 12/1991 | Namioka | 375/200 |
| 5,289,499 | 2/1994 | Weerackody | 375/206 |
| 5,309,474 | 5/1994 | Gilhousen et al. | 375/200 |
| 5,414,728 | 5/1995 | Zehavi | 375/200 |
| 5,418,814 | 5/1995 | Hulbert | 370/342 |
| 5,440,597 | 8/1995 | Chung et al. | 375/206 |

FOREIGN PATENT DOCUMENTS

WO 91/07036  5/1991  WIPO.

*Primary Examiner*—Alpus H. Hsu
*Attorney, Agent, or Firm*—Hill & Simpson

[57] ABSTRACT

The invention relates to pilot assisted direct sequence spread spectrum links. Fine code synchronization generally requires either multiple receiver correlators (early/prompt/late) or jittered receiver correlators. The present invention removes the need for either by jittering the pilot code at the source so that the receiver only needs to examine a single code phase and can generate a fine code phase steering signal from the difference between the pilot energy measured when transmitted early and measured when transmitted late.

14 Claims, 7 Drawing Sheets

PILOT ASSISTED DIRECT SEQUENCE SPREAD SPECTRUM SYNCHRONIZATION APPARATUS

This application is a continuation-in-part of my prior application Ser. No. 08/508,629, filed Jul. 28,1995, titled "SYNCHRONIZATION APPARATUS", now abandoned, which is incorporated herein by reference.

BACKGROUND OF THE INVENTION

1. Field of the Invention

The present invention relates generally to the field of telecommunications, and, more particularly, the present invention relates to a synchronization apparatus primarily used in the downlink (base station to mobile unit direction) of either a cellular mobile radio system or a so-called "last mile" radio access network for fixed connection telephony.

2. Description of the Related Art

The synchronization apparatus of the present invention employs the radio access method known as Code Division Multiple Access (CDMA) using Direct Sequence Spread Spectrum (DSSS). For convenience, the term "mobile" is used throughout this document to apply to the receiving end, however, this can also refer to the equipment at a customer's premises for the radio access network.

It is assumed that many signals are transmitted from the base station on a single carrier and that a common spread spectrum pilot signal is also transmitted to provide phase information, allowing coherent demodulation in the mobile receivers. Such a pilot signal also provides amplitude information for the different signal components received over the various radio paths, allowing efficient combining in a so-called "Rake" receiver.

DSSS radio links include a transmitter in which the data signal is spread by a spreading code, and a receiver in which the signal is despread by the same spreading code. Correct operation of the despreader requires synchronization of the code in the receiver with that generated in the transmitter, shifted appropriately by any delays in the signal path. In the case of a pilot signal assisted radio link, synchronization of the pilot and signal code are required. However, because of the fixed relationship between the pilot code and the signal code and because the pilot transmission is generally stronger than any individual signal transmission, synchronization is generally performed on the pilot alone.

Initial coarse synchronization is generally achieved either by examining many pilot code phases simultaneously with parallel hardware or by stepping a single receiver code phase until a correlation peak is found. Where minimum hardware complexity is desired, the latter approach is most frequently used. Once the approximate code phase has been found it is desirable to provide a means to achieve fine synchronization wherein the correlation for every bit is obtained at the peak value. The correlation shape is determined by the convolution of the transmitter filter shape with the receiver filter shape. For a frequency channelized system, as is generally necessary for the application cited, relatively sharp filtering will be applied and the correlation function will be a smoothly peaking function.

A conventional approach uses three correlators, an early, a late and a prompt correlator. Moreover, the signal must be sampled frequently enough to allow the different correlators to take the different timings simultaneously. Alternatively, the Tau dither loop could be used, but this has some disadvantages. In such systems, a dithering circuit is required in every receiver, and the signal code is never held on the prompt position but jitters about it.

The present invention has the following advantages: sampling once per chip only is required, and the timing of the sampling clock can be altered to achieve the fine control of the code timing. Only one pilot correlator and one signal correlator is needed. The average of the pilot code position is correct (prompt) and the signal code position is prompt so no additional loss arises from the jittering.

An object of the invention is to provide a method of permitting accurate fine synchronization of the code phase timing (to a fraction of a chip) with very low complexity in the mobile receiver.

Some of the complexity which would normally reside in the receiver is effectively transferred to the transmitter. However, this additional complexity applies only to the pilot generator in the transmitter.

SUMMARY OF THE INVENTION

According to the present invention a synchronization apparatus is provided for use in Code Division Multiple Access (CDMA) Systems employing direct sequence spread spectrum, including means for jittering a timing of a pilot signal code symmetrically about the timing of a signal code, means for measuring pilot energy while the code is early and late, and means for generating a steering signal based upon the difference between the measured energies which is used to control the timing of the code phase to obtain a peak response.

BRIEF DESCRIPTION OF THE DRAWINGS

Various embodiments of the present invention will now be described with reference to the accompanying drawings wherein.

DETAILED DESCRIPTION OF THE PRESENTLY PREFERRED EMBODIMENTS

Figure 1:
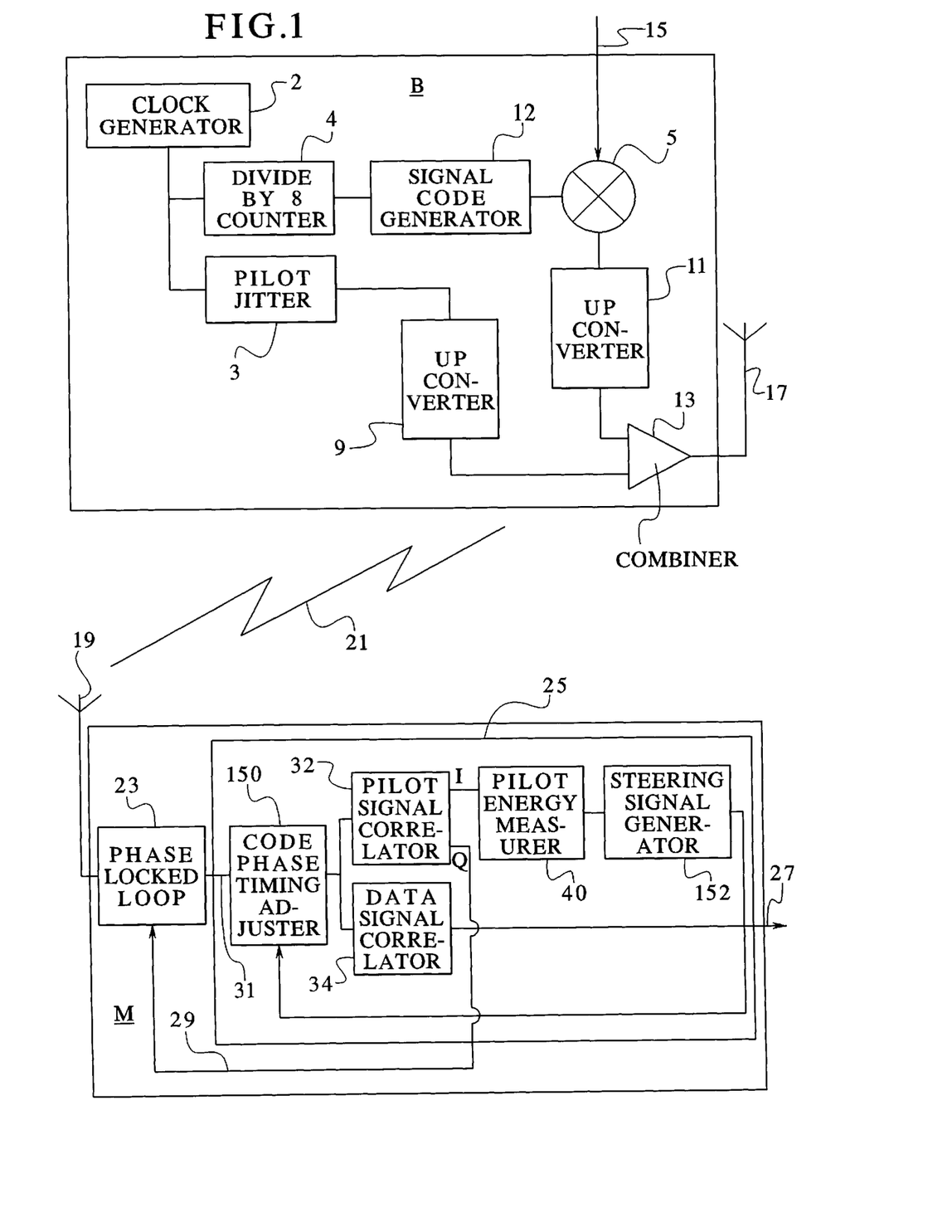
FIG. 1 is a block diagram illustration of a mobile and a base station operating within a CDMA system.

An embodiment of the present invention will now be described with reference to a base station and a mobile station which include synchronization apparatus embodying the present invention. In FIG. 1, a base station B is shown to transmit CDMA signals 21 to a mobile station M, and circuits which comprise transmission of CDMA signals are shown within the base station B whereas circuits which operate to receive the CDMA signals are shown within the mobile station M. Within the base station B, a clock generator 2, operates to generate an eight times over sampled chip rate clock signal. The eight times over sampled chip rate clock signal generated by the clock generator 2, is fed to a signal code generator 12 via a divide by eight counter 4, which operates to reduce the eight times over sampled signal to a signal substantially at a chip rate. Signal code generator 12 generates a CDMA spreading code at the chip rate in accordance with the chip rate clock which is now fed through a modulator 5. The modulator 5 operates to modulate the signal code generated by the signal code generator 12 in accordance with digital data fed from a conductor 15, which serves to spread the digital data fed from the conductor 15 in accordance with spread spectrum principles. An output of the modulator 5 is thereafter fed to an up converter 11 which operates to convert the baseband spread spectrum signal generated by the modulator 5 to an RF frequency which is thereafter fed to a first input of a combiner 13.

The eight times over sampled clock is also fed to a pilot jitter circuit 3 which operates to generate a spread spectrum pilot signal in accordance with a pilot code of the CDMA system, and furthermore, operates to introduce timing jitter into the pilot signal such that the spreading code of the pilot signal is advanced in time for a predetermined number of chips and thereafter retarded in time for further predetermined number of chips. The jitter pilot code is thereafter fed to an up converter unit 9 which operates to generate an RF signal representative of the baseband spread spectrum jitter pilot signal from the unit 3. The jitter pilot signal is subsequently fed to a second input of the combiner 13. The combiner 13 operates to combine the pilot signal with the data signal which are fed to an antenna 17. Radio frequency signals representative of the CDMA signals are propagated by the antenna 17 via the ether and are received at a receive antenna 19 of the mobile unit M.

In the mobile unit M, a down converter and phase locked loop stage 23 is fed with received radio frequency signals from the antenna 19 and serves to generate a filtered analog complex baseband signal representative of the CDMA signals received by the antenna 19. The filtered analog complex baseband signals are thereafter fed to a synchronization circuit 25 via a conductor 31.

The synchronization circuit 25, is shown to be comprised of a code phase timing adjuster 150, connected to a pilot signal correlator 32, and a data signal correlator 34. The pilot signal correlator 32, is shown to generate I and Q components of the complex baseband representation of the despread pilot signal. The I component output is connected to a pilot energy measurer 40. An output of pilot energy measurer 40, is thereafter connected to a steering signal generator 152, an output of which is fed to an input of the code phase timing adjuster 150. The code phase timing adjuster 150, operates to adjust the chip rate sampling time of the received analog complex baseband signals fed from the down converter and phase locked loop stage 23. The chip rate sampling time is adjusted in response to steering signals generated by the steering signal generator 152. The steering signal generator 152, generates steering signals in dependence upon the measured energy of the I component of the received jittered pilot signal provided by the pilot energy measurer 40. As will be appreciated, a representative measurement of the energy of the jittered pilot signal may also be provided from the Q component or, indeed both I and Q components. With the present embodiment, the Q component is fed back to the down converter and phase locked loop stage 23, to provide a phase reference signal.

The synchronization circuit 25 operates to maintain synchronization of the mobile unit to the data bearing radio signals transmitted by the base station B in accordance with the jittered pilot signal which is jittered symmetrically about a timing reference. Data representative of the data transmitted from the base station B fed via conductor 15 is thereafter output from the synchronization circuit 25 on the conductor 27.

Figure 2:
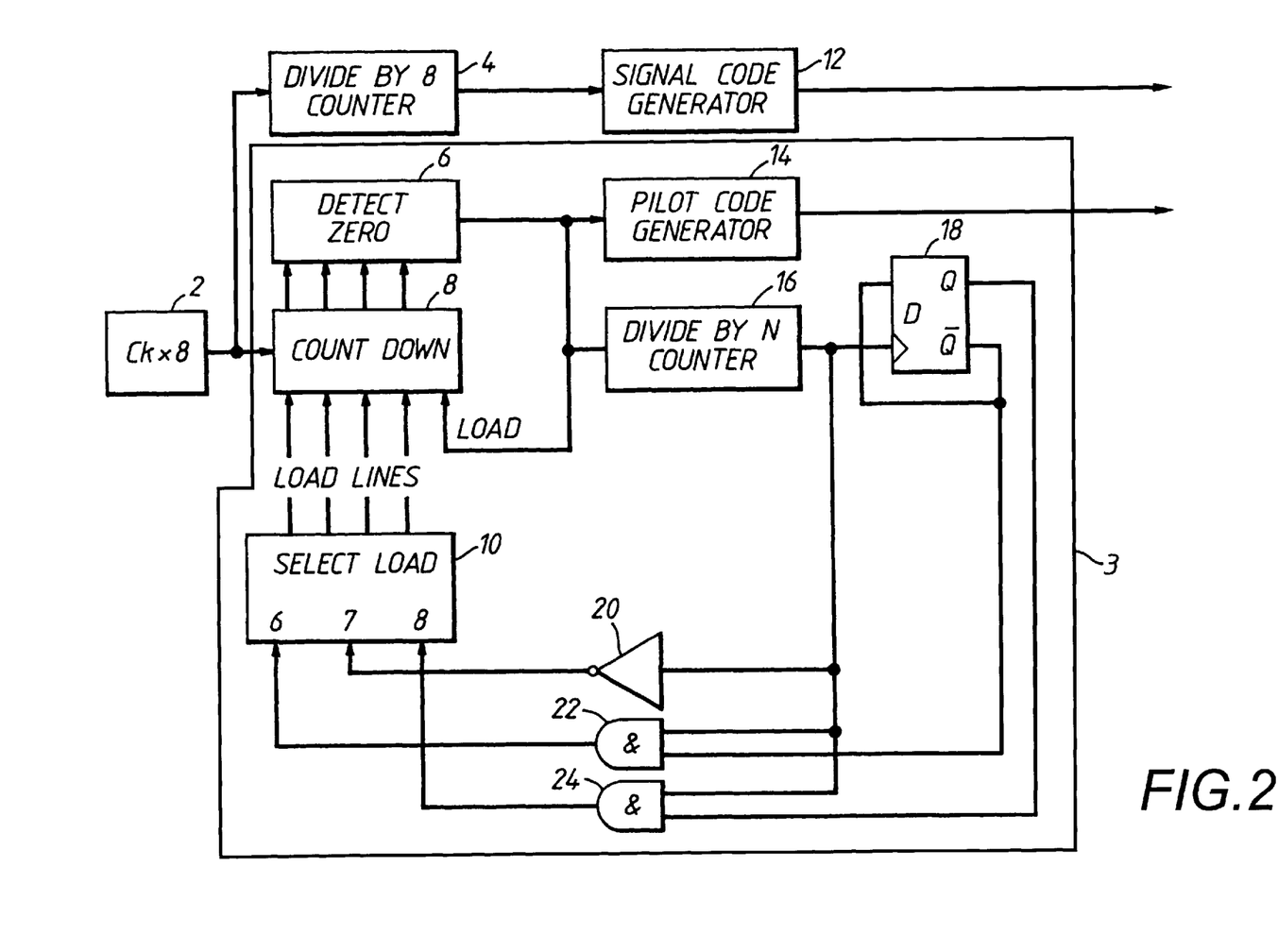
FIG. 2 is a block diagram illustration of a pilot jitter circuit.

The outputs of the countdown counter 8 are connected to a zero detection circuit 6, the output of which is connected to a pilot code generator 14, to an input of a divide by N counter 16 and to an input of the countdown counter 8. The divide by N counter 16 is connected to a D-type flip flop 18, the outputs of which are connected to the respective inputs of an AND gate 22, 24. The output of the divide by N counter 16 is also connected to an input of an inverter 20. An output of the inverter 20, and an output of the AND gates 22, 24 are connected to an input of a select load circuit 10, respectively. The select load circuit 10 has four output lines, each of which is connected to a respective input of the countdown counter 8. The output of the divide by N counter 16 is also connected to a further input of the AND gates 22, 24.

Operation of the clock jitter circuit 3 will now be described. The phase of the pilot code is jittered one eighth of a chip early after N chips, then one eighth of a chip late after another N chips, and the cycle repeats itself. The countdown counter 8, the zero detection circuit 6 and the load selection circuit 10 comprises a divide by x, y or z counter, where x is seven, y is eight and z is nine. Normally the counter divides by eight producing a clock at chip rate from the clock unit 2. However, when the divide by N counter 16 completes its cycle it produces a pulse, one chip wide, during which the load is not seven but either six or eight depending upon the state of the D-type flip flop 18 which toggles between high and low signal levels. When the counter loads six, the pilot code phase is advanced by one eighth of a chip and when it loads eight the pilot code phase is retarded by one eighth of a chip. The signal code phase is generated by a separate divider and is not jittered.

It should be noted that although a simple switching between early and late pilot code phase is described, any approach which involves some controlled variation of the pilot code phase falls within the scope of the present invention.

While the variation of code phase will increase the transmitted bandwidth for the pilot slightly, this is not considered a problem because the pilot energy represents only a small proportion of the transmitted power for a fully loaded cell. If the cell is not fully loaded, then the absolute power is reduced. Also, the transmit pulse shaping filter will contain the spectrum.

Figure 3:
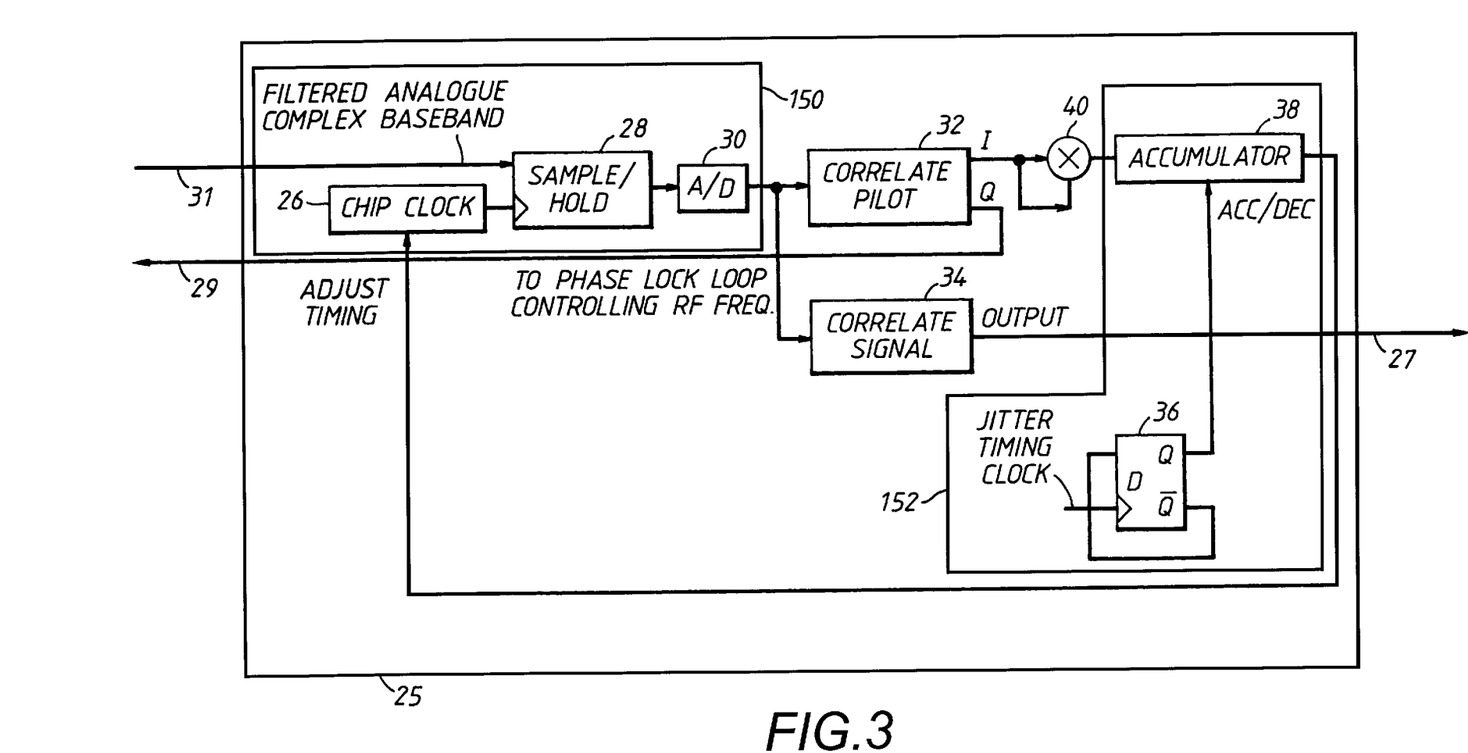
FIG. 3 is a block diagram illustration of a basic receiver clock correction circuit.

Referring to FIG. 3, a block diagram is shown of an exemplary embodiment of the synchronization circuit 25 where parts also appearing in FIG. 1 bear like numerical designations. The synchronization circuit 25 is shown to have a code phase timing adjuster, 150 comprising a clock generation circuit 26 for generating a chip clock which drives a sample and hold circuit 28. The sample and hold circuit 28 also receives a complex baseband signal which is in analog form and has been filtered. The output of the sample and hold circuit 28 is connected to the input of an analogue-to-digital converter 30, the output of which is connected to an input of a correlate pilot circuit 32 and to a correlate signal circuit 34 which generates an output signal. The correlate pilot circuit 32 generates an in-phase and a quadrature phase output signal. The quadrature phase output signal is fed back via conductor 29 to the unit 23 where it is applied to a phase lock loop for controlling the RF frequency. The in-phase signal is squared by a multiplier 40, which forms a pilot energy measurer, the output of which is applied to a steering generator 152, comprising an accumulator 38 and a D-type flip flop 36. The output of the accumulator 38 is used to adjust the timing of the clock generator circuit 26. The accumulator 38 is controlled by a D-type flip-flop 36 which is driven from a jitter timing clock.

The circuit as shown in FIG. 3 allows operation with sampling at only one sample per chip (provided all necessary filtering can be performed in analog circuitry). The signal is sampled and digitized according to the chip clock generated by circuit 26. The correlator 32 produces complex outputs of the correlation with the pilot. The quadrature channel feeds back to the down converter and stage 23, phase lock loop via conductor 29, which tends to adjust the Q output to zero. Thus, all the pilot amplitude appears on the in-phase channel. Squaring by the multiplier 40 yields an estimate of the pilot's energy. This is fed to the accumulator 38 which alternately adds and subtracts the estimate from the previous running total. The control of the timing is such that addition is performed when the pilot code is transmitted early and subtraction is performed when the pilot code is transmitted late. Synchronization of these functions is straightforward because the timing of the switching between late and early code phase will be given a fixed relationship to the spreading code sequence itself.

Thus the accumulator 38 serves not only as a differencing circuit but also as an integrator which acts as a loop filter for the timing control loop. The output of the accumulator 38 feeds back to adjust the timing of the clock generation circuit 26 in order to tend to minimize the mean difference between the energy between the early pilot code transmissions and the late pilot code transmissions.

Figure 4:
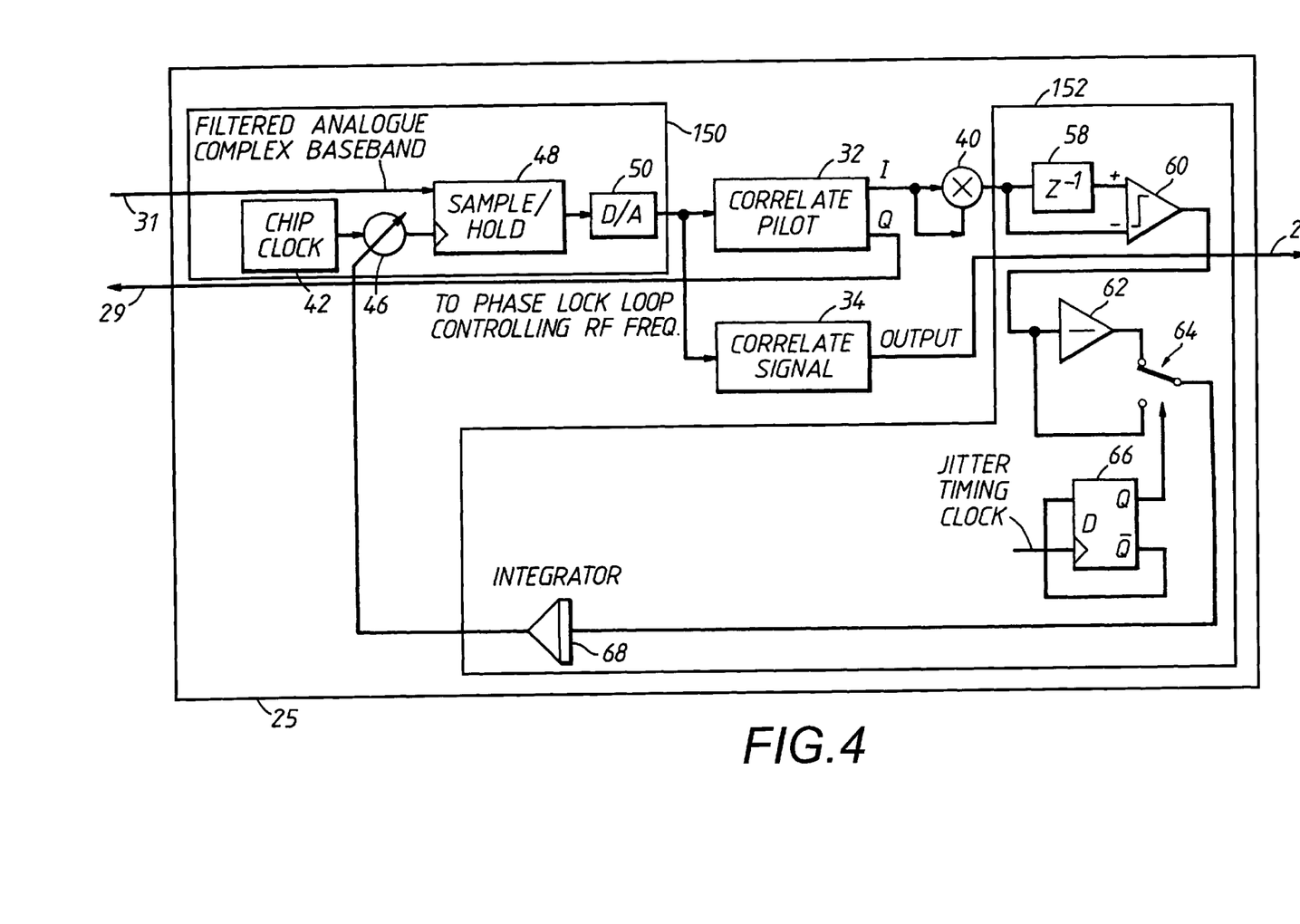
FIG. 4 is a block diagram illustration of a clock correction circuit for analog phase modulation.

The circuit as just described is well suited to the case where the adjustment of the receiver code phase is performed in a digital fashion. In some applications, (e.g. for very large spread band-widths in which a primary clock several times faster than the chip rate is undesirable or impractical), it may be preferable to implement the code phase timing adjuster 180, in an analog fashion. For example, an analog type phase modulator such as a pulse width modulator might be used. In this case an analog phase modulator together with a digital-to-analog converter might be assumed to be included within the clock generation circuit. The additional circuitry of a digital-to-analog converter might be considered to be undesirable however. FIG. 4 illustrates an alternative receive synchronization circuit 25, comprising a code phase timing adjuster 150, which allows control of an analog phase modulator while eliminating the need for a explicit digital-to-analog converter.

In FIG. 4, points also appearing in FIGS. 1, 2 and 3 bear the same numerical designations.

Referring to FIG. 4, a code phase timing adjuster 150 is shown to be comprised of a clock generator circuit 42, an analogue phase modulator 46, a sample and hold 48, and analog-to-digital converter 50. The clock generator circuit 42 is connected to the sample and hold circuit 48 by way of an analog phase modulator 46. The sample and hold circuit 48 also receives a filtered analog complex baseband signal. The output of the sample and hold circuit 48 is connected to an input of a analog-to-digital converter 50, the output of which is connected to the input of a correlate pilot circuit 32 and to a correlate signal circuit 34. The output of the correlator signal circuit 34 represents the output signal. The correlate pilot circuit generates an in-phase and quadrature phase output signal. The quadrature phase output signal is used to control an RF frequency by way of a phase lock loop. The I output is connected to a multiplier 46 which is arranged to square the I output. The output of the multiplier 56 is applied to the input of a delay line 58 and also to the input of a hard limiting device 60. The multiplier 40 forms a pilot energy measurer. The delay line 58, hard limiting device 60, subtractor 62, switch 64, D-type flip flop 66 and integrator 68 serve in combination to form a steering signal generator 152. The output of the delay line 58 is connected to a further input of the hard limiting device 60. The output of the hard limiting device 60 is connected to an input of the subtractor 62 and to a first terminal of the switch 64. The output of the subtractor 62 is connected to a second terminal of the switch 64. A third terminal of the switch 64 is connected to the integrator 68, the output of which is used to drive the analog phase modulator 46 connected between the clock generation circuit 42 and the sample and hold circuit 48. The switch 64 is controlled by the D-type flip-flop 66 which is driven by a jitter timing clock signal.

The circuit as described above forms the sign of the difference between the energies of adjacent early/late measurements. Depending on which came first, the sign may need to be inverted, and this is carried out by the subtractor 62 and the switch 64 under control of the jitter timing clock. The output of the switch is a binary signal which is applied to an analog integrator 68 which serves as a loop filter. This filtering generates the analog control signal and is applied to the analog phase modulator 46. A small, but often acceptable, degradation in performance results from the limiting.

The circuits described above are suitable for a basic spread spectrum receiver. In the case of a Rake receiver, oversampling of the signal will be required since different fine chip phases are likely to be needed for the different Rake fingers. In the case of a receiver using phase lock loop Rake fingers, the architecture would be typically as shown in FIG. 5, where points also appearing in FIGS. 1, 2, 3 and 4 bear the same numerical designations.

Figure 5:
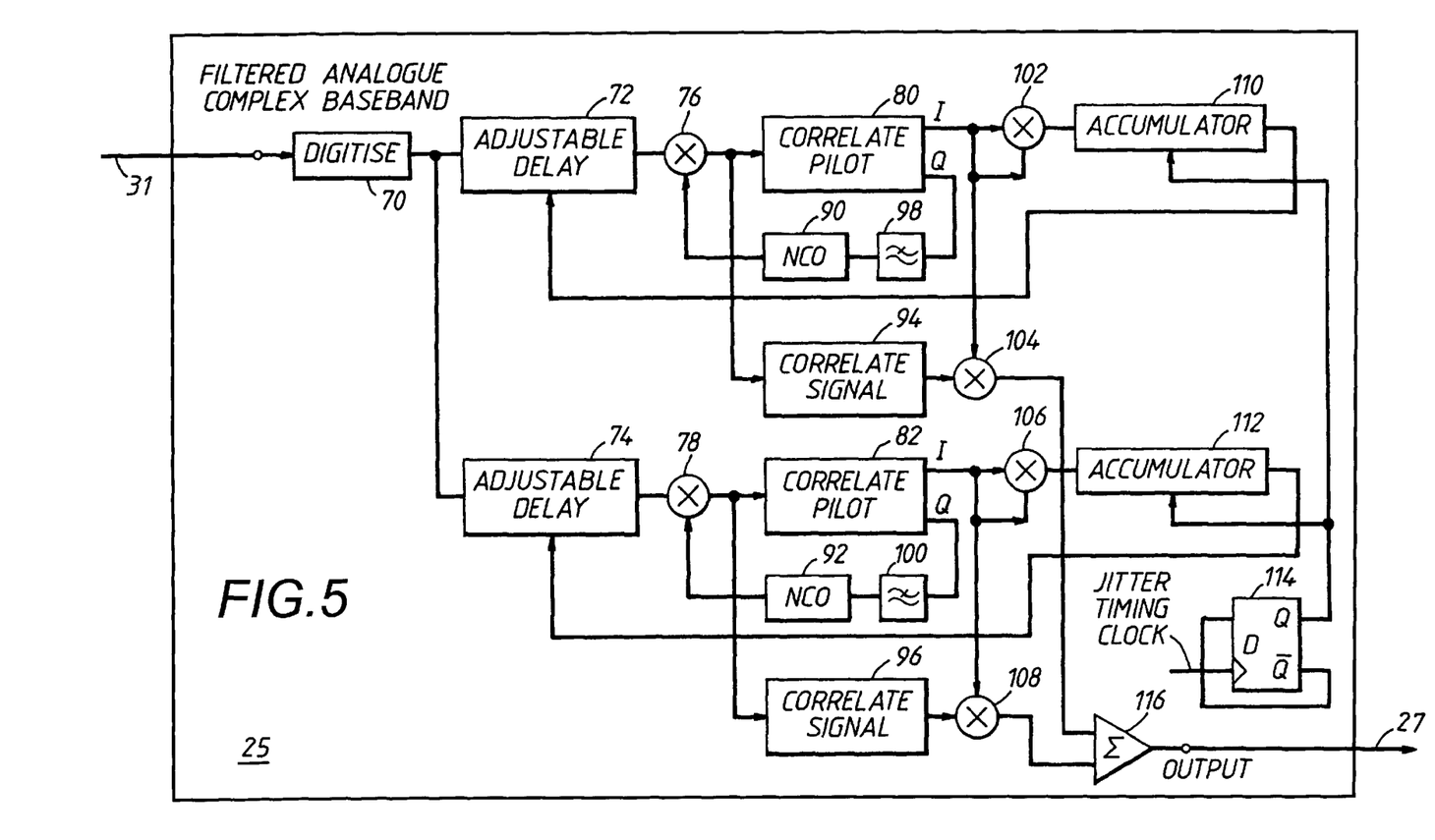
FIG. 5 is a block diagram illustration of a phase lock loop two finger Rake receiver with a clock correction circuit.

Referring to FIG. 5, a filtered analog complex baseband signal is received via conductor 31, at a digitizing circuit 70. The output of the digitizing circuit 70 is connected to the input of two adjustable delay circuits 72 and 74 respectively. The output of the delay circuit 72 is connected to an input of a multiplying circuit 76, the output of which is connected to an input of a correlate pilot circuit 80 and to a correlate signal circuit 94. The in-phase output of the correlate pilot circuit is connected to first and second inputs of a multiplying circuit 102. The quadrature phase output of the correlate pilot circuit 80 is connected to an input of a filter 98, the output of which is connected to a numerically controlled oscillator 90. An output from the oscillator 90 is connected to a further input of the multiplying circuit 76. The in-phase output of the correlate pilot circuit is also connected to an input of a multiplying circuit 104, which at a further input thereof, receives an output from the correlate signal circuit 94. The output of the multiplying circuit 102 is connected to an input of an accumulator 110, the output of which is fed back to control the adjustable delay circuit 72. The output of the multiplying circuit 104 is connected to a first input of a summer 116, the output of which generates the data output signal. The adjustable delay circuit 74 has an output connected to an input of a multiplying circuit 78, the output of which is connected to a correlate pilot circuit 82 and to a correlate signal circuit 96. The in-phase output from the correlate pilot circuit 82 is connected to first and second inputs of a multiplying circuit 106 and to a further input of a multiplying circuit 108. The output of the correlator signal circuit 96 is connected to a further input of the multiplying circuit 108, the output of which is connected to a further input of the summer 116. The quadrature output signal from the correlate pilot circuit 82 is connected to a filter 100, the output of which is connected to a numerically controlled oscillator 92, the output of which is applied to a further input of the multiplying circuit 78. The output of the multiplying circuit 106 is connected to the input of an accumulator 112, the output of which is fed back to the adjustable delay circuit 74. A D-type flip-flop 114 is used to control the accumulators 110 and 112, and receives a jittered timing clock signal.

Figure 6A:
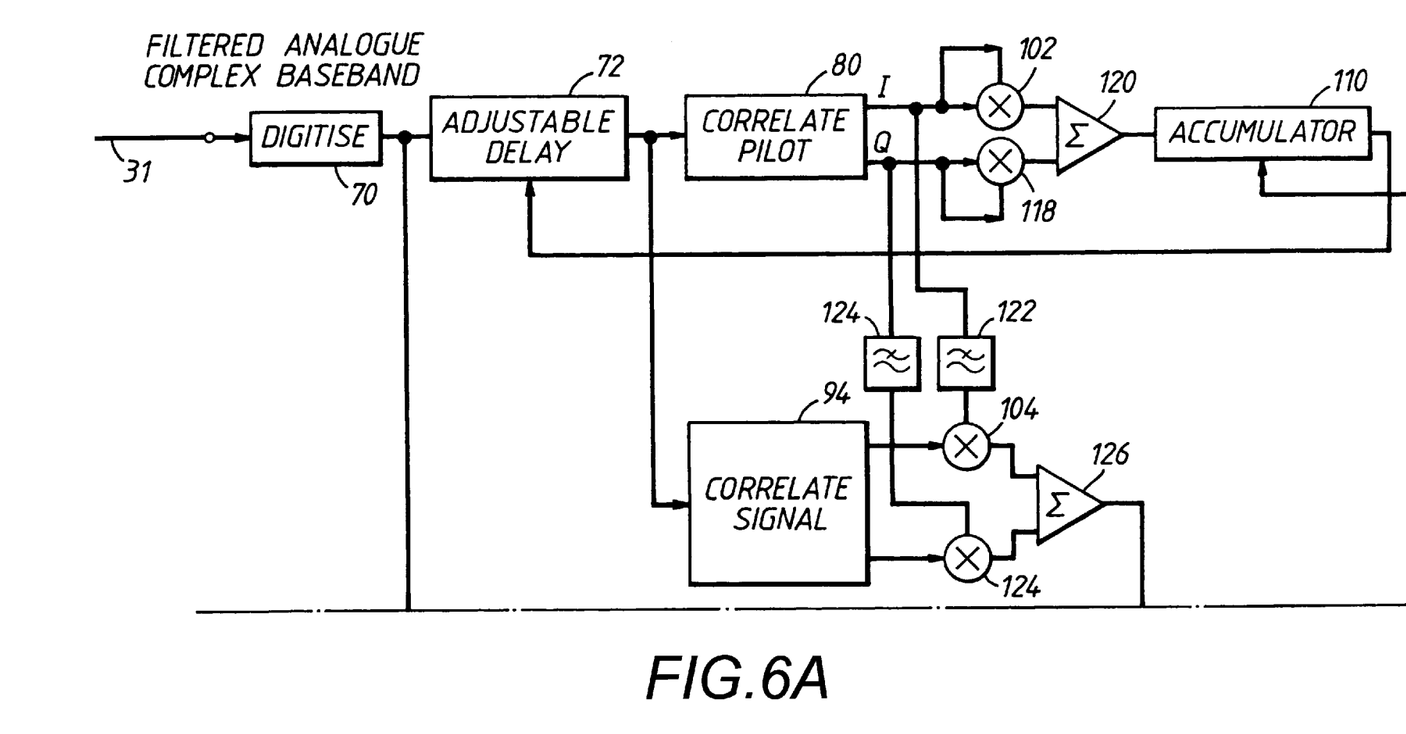
FIGS. 6A and 6B is a block diagram illustration of a feed forward two finger Rake receiver with a clock correction circuit.
Figure 6B:
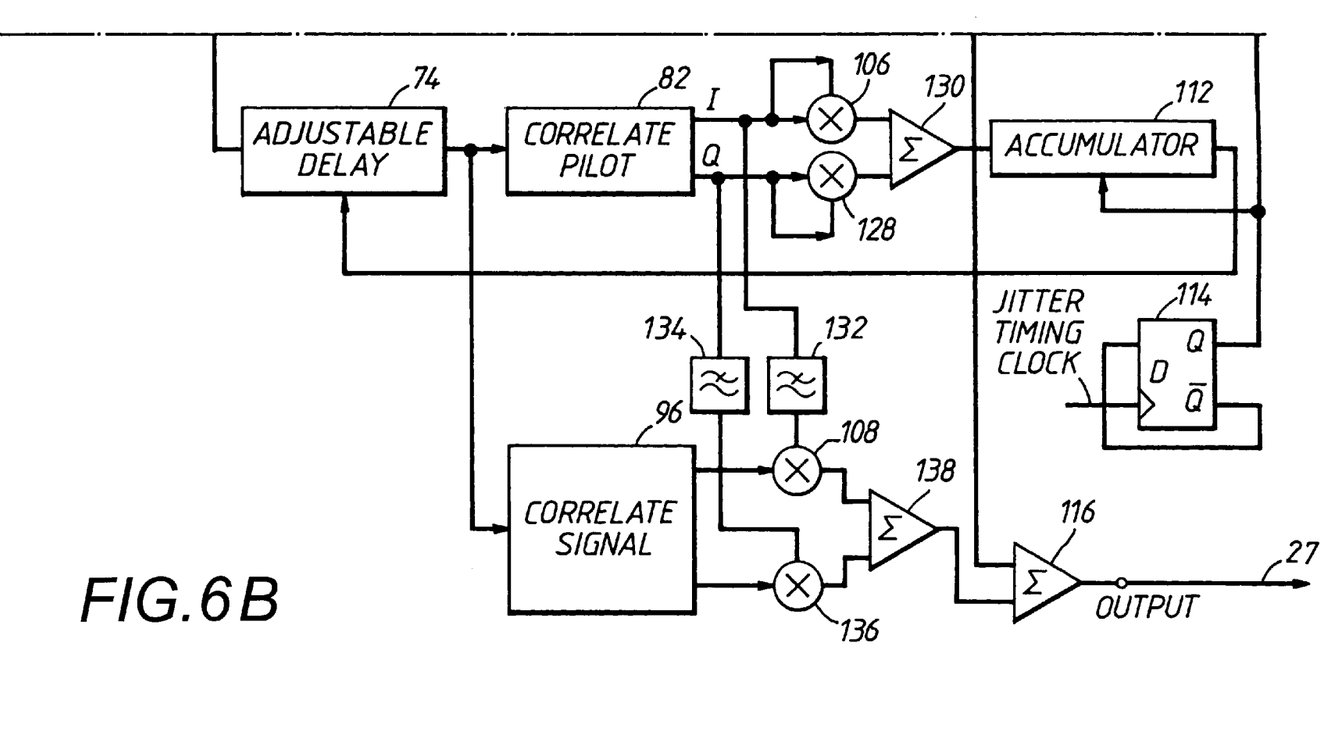

The circuit described above is similar to FIG. 3 except that the digitized signal must be oversampled so the adjustable delay circuits 72, 74 are essential to the operation performed by selecting the best of the available samples from the oversampled range (e.g. the best of eight for an eight sample per chip register). The adjustable delay circuits 72, 74 will also have been set more closely by other means to select the two strongest multipath components. The phase lock loop is now implemented fully digitally with complex numerically controlled oscillators 90, 92 and the mixer in the loop formed by the multiplying circuits 76, 78 are fully complex. Therefore, no feedback signals to the down conversion unit 23, is required in this case. The fine clock phases on the two Rake fingers are controlled independently and the outputs of the Rake fingers which appear on the in-phase at the output of the correlator signal circuit 94, 96 are weighted in amplitude according to the level of the I phase at the output of the pilot correlator 80, 82 respectively. The weighted outputs are then added together to generate the overall decision variable which may either be limited to produce the demodulator BPSK or quantisized to provide soft decisions if the modulation was originally forward error correction encoded. If a feed forward receiver is implemented then the architecture of FIGS. 6A and 6B applies. FIGS. 6A and 6B are similar to FIG. 5 and like circuit elements have been given like reference numerals. The differences are as follows:

A quadrature phase output from the correlate pilot circuit 80 is connected to both inputs of a further multiplying circuit 118 and the output of the multiplying circuits 102, 118 are applied to a summer 120 before being presented to the accumulator 110. The in-phase and quadrature phase outputs from the correlate pilot circuit 80 are respectively applied to a filter 122, 124 the outputs of which are applied to an input of a respective multiplying circuit 104 and 124. The multiplying circuits 104, 124 receive at a further input thereof, a respective output signal from the correlate signal circuit 94. The outputs from the multiplying circuits 104, 124 are applied to a summer 126, the output of which is applied to an input of the summer 116.

Similarly the in-phase and quadrature phase outputs from the correlate pilot circuit 82 are applied to both inputs of the multiplying circuit 106 and to both inputs of the multiplying circuit 128 respectively. The outputs of the multiplying circuits 106, 128 are applied to a respective input of a summer 130 before being applied to the accumulator 112. The in-phase and quadrature phase outputs from the correlate pilot circuit 82 are respectively applied to a filter circuit 132, 134, the outputs of which are applied to a first input of a multiplying circuit 108 and to a first input of a multiplying circuit 136 respectively. The multiplying circuits 108, 136 at a further input thereof receive the output from the correlate signal circuit 96. The outputs from the multiplying circuits 108, 136 are applied to a respective input of a summer 138, the output of which is applied to a further input of the summer 116.

With reference to FIGS. 6A and 6B, the I and Q components of the pilot measurements (improved by means of the estimating filters) on each Rake finger are used to phase align and amplitude weight the signals prior to combining. There is no phase locked loop to reduce the power on the Q output to zero, and therefore the powers on the I and Q outputs must be computed and added.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A synchronization apparatus for use in code division multiple access systems employing direct sequence spread spectrum, to communicate data from a transmitter to a receiver of the system, said synchronization apparatus comprising:

a pilot jitter circuit embodied within the transmitter, for jittering a timing of a pilot signal code symmetrically about a timing of a signal code, wherein the pilot signal code and signal code are thereafter used to generate spread spectrum radio signals transmitted by the transmitter;

a synchronization circuit embodied within the receiver which operates on received baseband representations of the radio signals to maintain synchronization with said signal code in accordance with any early jitter and a late jitter of the pilot code, the synchronization circuit comprising:

a means for measuring a pilot energy; and a means for generating a steering signal based upon a difference between the pilot energy at the early jitter and the pilot energy at the late jitter, the steering signal being used to control the timing of the code phase to obtain a peak response.

2. The synchronization apparatus of claim 1, wherein the pilot jitter circuit comprises a countdown counter, a zero detection circuit associated with the countdown counter, and a load selection circuit associated with the zero detection circuit.

3. The synchronization apparatus of claim 2, wherein the load selection circuit further comprises a means for loading a value of six, seven or eight, and when a value of six is loaded the pilot code phase is advanced one eighth of a chip, and when a value of eight is loaded, the pilot code phase is retarded by one eighth of a chip.

4. The synchronization apparatus of claim 3, wherein the load selection circuit further comprises a divide by N counter connected to a D-type flip-flop for controlling the load selection circuit.

5. The synchronization apparatus of claim 1, wherein the means for measuring the pilot energy comprises a multiplier which squares an in-phase output from a correlate pilot circuit, and an accumulator for receiving an output signal from the multiplier which is arranged to alternately add and subtract the output signal from a running total.

6. The synchronization apparatus of claim 5 wherein a D-type flip-flop receives a jittered timing signal for controlling addition and subtraction.

7. The synchronization apparatus of claim 5, wherein the output of the accumulator is connected to a chip clock circuit for controlling said clock circuit, said clock circuit being connected to a sample and hold circuit which receives a filtered analog baseband signal that is sampled prior to being applied via a conversion means to the correlate pilot circuit.

8. The synchronization apparatus of claim 7, wherein an analog phase modulator is connected between the clock circuit and the sample and hold circuit, and the accumulator is replaced by a delay device connected to the output of the multiplier, a hard limiting device having a first input connected to the output of the delay device, and a second input connected to the output of the multiplier, an output of the hard limiting device being connected to a subtractor arranged to be switched in circuit or short-circuited, for controlling the analog phase modulator.

9. The synchronization apparatus of claim 8, wherein the switch is controlled by a D-type flip-flop which receives a jitter timing signal, and wherein the output of the subtractor is fed into the analog phase modulator through an integrator.

10. The synchronization apparatus of claim 5, wherein the apparatus is embodied in a Rake receiver, and wherein each Rake finger comprises the apparatus claimed in claim 5, and wherein the output of the accumulator is connected to an adjustable delay circuit for controlling the adjustable delay circuit, said adjustable delay circuit having an input for receiving a baseband signal and an output connected to a further multiplier, the output of the further multiplier is connected to an input of a correlate pilot circuit and to an input of a correlate signal circuit, said further multiplier being controlled by a phase lock loop comprising a filter connected to a quadrature phase output of the correlate pilot circuit, and a numerically controlled oscillator connected to an output of the filter and to a further output of said further multiplier.

11. The synchronization apparatus of claim 5, wherein the synchronization apparatus is embodied in a feed forward Rake receiver, and wherein each Rake filter of the receiver includes the apparatus of claim 5, and further comprising a correlator pilot circuit and a correlate signal circuit, an in-phase and quadrature phase output from the correlate pilot circuit being respectively squared by a multiplying means and summed by a summer, the output of the summer being connected to the accumulator, an output of the accumulator connected to an adjustable delay device for controlling the adjustable delay device, the accumulator having an input arranged to receive the baseband signal, and an output connected to an input of the correlate pilot circuit and to an input of the correlate signal circuit.

12. The synchronization apparatus of claim 11, wherein the in-phase and quadrature phase outputs from the correlate pilot circuit are filtered by a filtering means and multiplied with a respective output from the correlate signal circuit by a multiplying means, the output signals from said multiplying means being added by summer to provide a signal output for the Rake finger.

13. A synchronization apparatus according to claim 1, wherein the jitter circuit operates to introduce timing jitter into the pilot code in relation to a predetermined number of chips of the pilot code, thereby providing the synchronization circuit with temporal correspondence between the measured pilot energy and the timing jitter.

14. A method of synchronizing pilot and data bearing spread spectrum radio signals at a receiver of a Code Division Multiple Access system, comprising the steps of:

(i) jittering a timing of a pilot signal code of the pilot signal to an early temporal position and a late temporal position with respect to a signal code of the data signal in accordance with a chip rate of the signal code of the data signal;

(ii) generating said spread spectrum pilot radio signal and said radio data signal from said pilot signal code and said data signal code, communicating said spread spectrum pilot signal and said data signals to a receiver;

(iii) generating a baseband representation of said communicated spread spectrum pilot and data radio signals;

(iv) sampling said spread spectrum radio signals in accordance with a variable timing rate corresponding to a chip rate of said pilot radio signal;

(v) correlating said spectrum radio signals against a locally generated representation of said pilot signal code and data signal code;

(vi) measuring the energy of said correlated pilot signal;

(vii) generating steering signals in accordance with a difference between the energy of said pilot signal at said early temporal position and said late temporal position; and (viii) adjusting the sampling rate of said radio signals in step (iv) in accordance with said steering signal.

* * * * *